Figure 1:
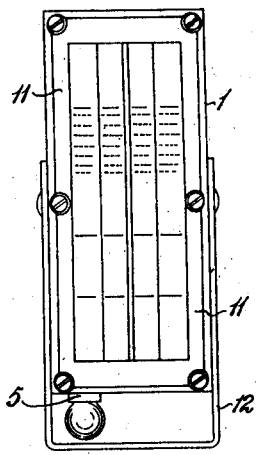

C. HYMANS.
RANGE FINDER OR TELEMETER.
APPLICATION FILED MAR. 7, 1916.

1,338,985.

Patented May 4, 1920.
2 SHEETS—SHEET 1.

Inventor
Charles Hymans
By M. Millar White
Attorney.

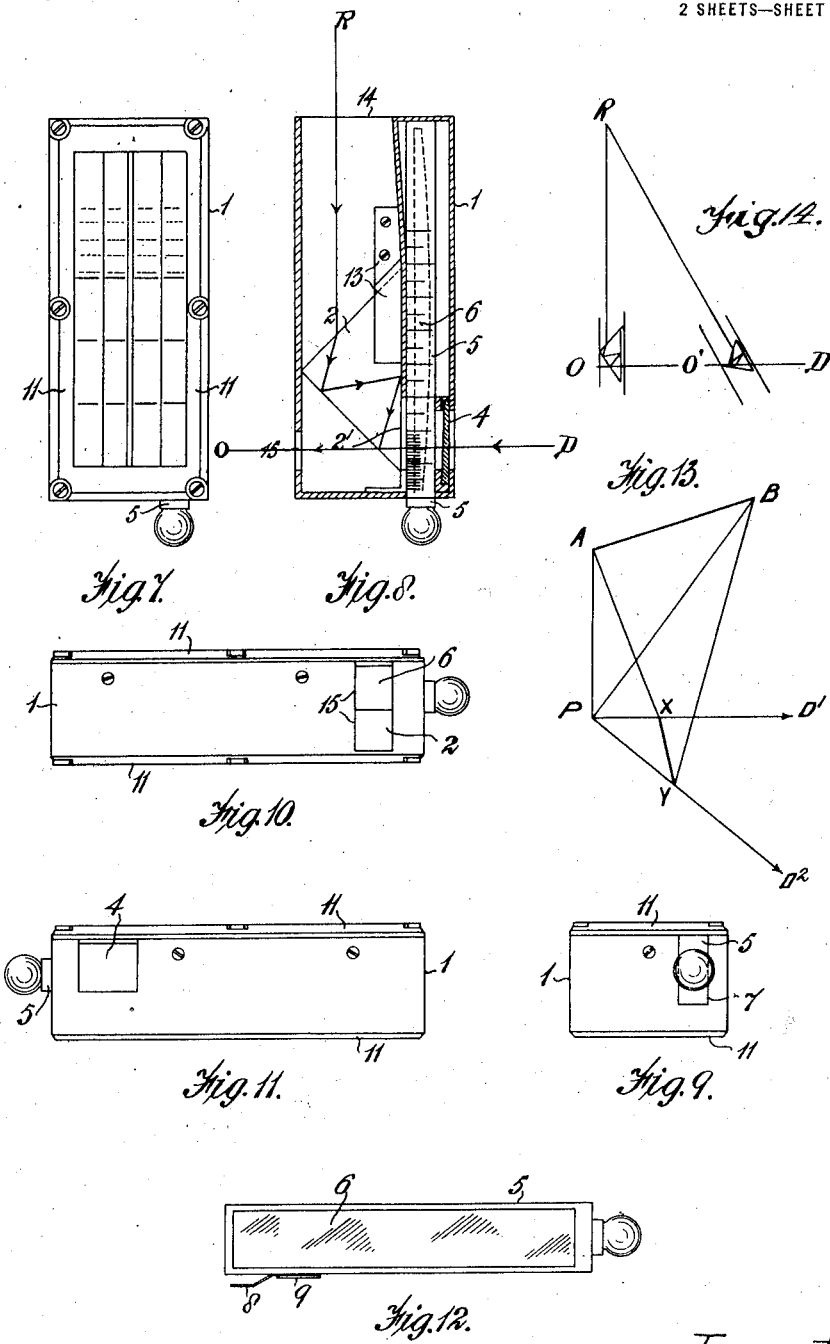

UNITED STATES PATENT OFFICE.

CHARLES HYMANS, OF CAMBRIDGE, ENGLAND.

RANGE-FINDER OR TELEMETER.

1,338,985.      Specification of Letters Patent.      Patented May 4, 1920.

Application filed March 7, 1916. Serial No. 82,586.

*To all whom it may concern:*

Be it known that I, CHARLES HYMANS, a subject of the King of Great Britain and Ireland, residing at 7 St. Andrew's street, Cambridge, Cambridgeshire, England, have invented new and useful Improvements in Range-Finders or Telemeters, of which the following is a specification.

The invention consists of improvements in range finders or telemeters.

The invention has been devised with the object of improving present constructions of range finders or telemeters and producing an instrument which will be of simple construction and therefore cheap to manufacture, easy to use, and of such size that it can be readily carried in the waistcoat pocket of the user. The improved instrument can, if necessary, be made of greater size.

The improved instrument consists of a containing case, a right-angled isosceles prism silvered on its hypotenuse, and concave and convex lenses of equal and opposite power, one of which lenses, preferably the convex lens, is adjustable with respect to the other and is carried in a slide marked with equal divisions or graduations. The isosceles prism is so mounted in the case that the image of the range-object seen by the user of the instrument is obtained as a result of double reflection within the prism, all images resulting from the direct reflection off the hypotenuse being cut off by the walls of the case, and therefore invisible to the user. As regards the concave and convex lenses the conjoint effect of these two lenses is that of a variable prism having an angle of deviation which increases regularly as the optical centers of the lenses are separated. The cotangent of this angle of deviation multiplied by a factor of known value, which in the primary use of the instrument is a base paced by the user, will give the range or distance of the object.

The prism image used in the range finder is that formed by double reflection within the prism, namely, by rays of light from the object falling on the first right face of the prism at such an angle that they are refracted on to the internal side of the second right face, thence totally reflected on to the hypotenuse which, being silvered, reflects them a second time, so that they pass out of the second right face. The directly or singly reflected images referred to are those formed by the rays which would enter the first right face at such an angle that they would fall directly on to the hypotenuse, and would be reflected therefrom out through the second right face. Such rays, however, are prevented by the walls of the instrument from reaching the prism, or if they do so, from reaching the eye of the user.

This method of finding the range or distance of an object is represented by the formula $$\text{Cot. } \theta \times n = r,$$

where $\theta$ is the angle of deviation, $n$ the known factor, such as a measured base, and $r$ is the range.

The invention is shown on the accompanying drawings which illustrate two forms of the improved instrument.

Figure 2:
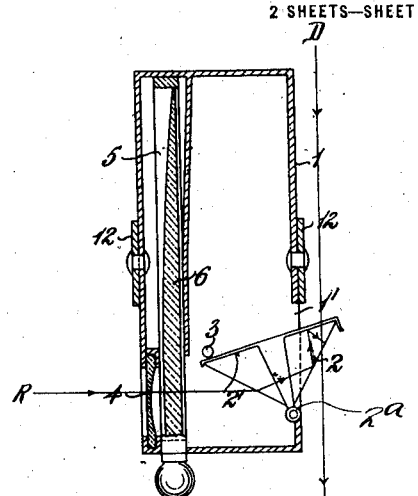
Figure 4:
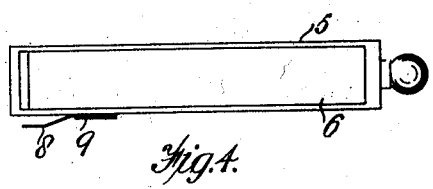
Figure 5:
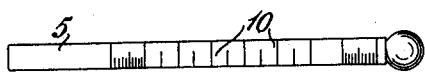
Figure 3:
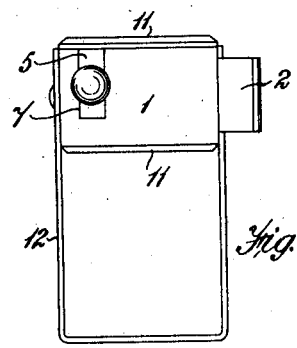
Figure 6:
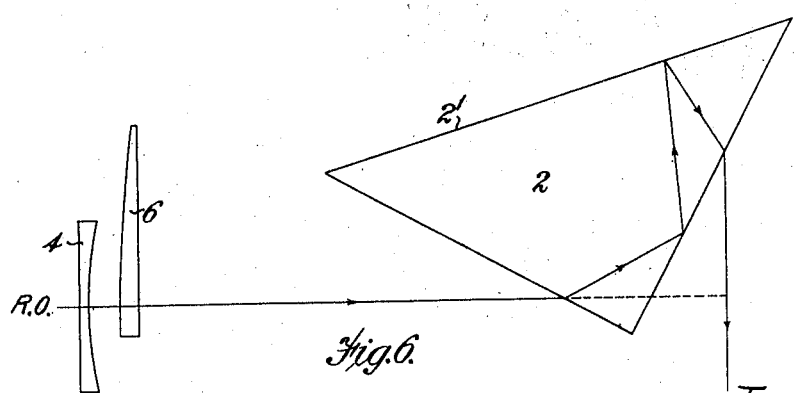

Of these drawings, Figure 1 is a plan of the one form of the instrument, the handle thereof being shown in the position occupied by it when the instrument is not in use. Fig. 2 is a horizontal section and Fig. 3 is an end view of the same form of instrument, showing the positions of the parts thereof when the instrument is ready to be used. Figs. 4 and 5 are a side elevation and a plan of the slide carrying the convex lens of the instrument. Fig. 6 is a diagram hereinafter referred to.

Fig. 7 is a plan of a second and preferred form of instrument. Figs. 8 and 9 are a horizontal section and an end view of the same form of instrument. Figs. 10 and 11 are side views of the instrument. Fig. 12 is a side view of said slide. Fig. 13 is a diagram explanatory of a particular use of the instrument. Fig. 14 is a diagrammatic view illustrating the two positions of the observer.

In these figures parts identical in construction or function are indicated by the same reference numerals.

Referring first to the construction of instrument illustrated by Figs. 1 to 5, 1 is a small box-shaped case of such size that it can be easily carried in the waist-coat pocket of the user of the instrument. 2 is a right-angled isosceles prism, silvered on its hypotenuse 2'. The prism 2 is pivotally mounted at 2ª within the case 1, at one side thereof, in such manner that when the instrument is in use the prism will project, through an opening 1', beyond the case of the instrument to a suitable extent, determined by a pin 3, while when the instrument is out of use the prism 2 can be housed within the case 1. 4 is a concave lens, which is mounted in the side of the case 1 opposite to that through which the prism 2 projects. 5 is a slide which is mounted in the case 1 at a suitable distance behind the concave lens 4 and carries a convex lens 6, which is formed by cutting away the side portions of a trifle more than one half of a convex lens. These two lenses 4 and 6 are of equal but somewhat weak power, and though preferably plano-concave and plano-convex, as shown, may be double concave and double convex or of meniscus form. The position of the slide 5 carrying the convex lens 6, and therefore the position of the optical center of the convex lens 6, is preferably adjusted by pulling out and pushing in said slide 5 directly by hand, though the adjustment of the position of the slide may be effected by any suitable mechanical means, such as a screw engaging with a nut on said slide and terminating in a milled head outside the case 1, or by means of a rack and pinion. The slide 5 passes through a gate 7 in the rear wall of the case 1 and is frictionally held in any position to which it may be moved by any suitable means, such as a spring 8 secured to the bottom of the slide 5, Fig. 4, and adapted to bear against the lower wall of the case 1, and a second spring, not shown, fixed to the upper wall of the case and adapted to bear against the top of the slide. The outward movement of the slide 5 is limited by a suitable stop, such as a piece 9 secured to the bottom of the slide 5 in such a position that it will come against the rear wall of the case 1 when the slide has been drawn out to the maximum extent within the capacity of the instrument. The slide is provided on its upper surface with equally spaced graduations or divisions 10 so as to indicate the movement given to said slide 5 and the convex lens 6. These divisions 10 are used, as will be hereinafter explained, in conjunction with a table comprising two columns, one of which contains said graduations or divisions while the other contains the co-tangent values of the deviating angles corresponding thereto. Assuming that the number of divisions on said slide is 80 and that each division is equal to one two-thousandth of the focal length of the convex lens, for example 0.66 mm. if the lens is 0.75 D power, corresponding to 1333 mm. focal length, then this table would be as follows:—

| Divisions on slide. | Co-tangents of angles of deviation. | Divisions on slide. | Co-tangents of angles of deviation. |
| --- | --- | --- | --- |
| 1 | 2000 | 41 | 48.8 |
| 2 | 1000 | 42 | 47.6 |
| 3 | 667 | 43 | 46.5 |
| 4 | 500 | 44 | 45.5 |
| 5 | 400 | 45 | 44.4 |
| 6 | 333 | 46 | 43.5 |
| 7 | 286 | 47 | 42.6 |
| 8 | 250 | 48 | 41.7 |
| 9 | 222 | 49 | 40.8 |
| 10 | 200 | 50 | 40.0 |
| 11 | 182 | 51 | 39.2 |
| 12 | 167 | 52 | 38.5 |
| 13 | 154 | 53 | 37.7 |
| 14 | 143 | 54 | 37.0 |
| 15 | 133 | 55 | 36.4 |
| 16 | 125 | 56 | 35.7 |
| 17 | 118 | 57 | 35.1 |
| 18 | 111 | 58 | 34.5 |
| 19 | 105 | 59 | 33.9 |
| 20 | 100 | 60 | 33.3 |
| 21 | 95.2 | 61 | 32.8 |
| 22 | 90.9 | 62 | 32.3 |
| 23 | 87.0 | 63 | 31.7 |
| 24 | 83.3 | 64 | 31.3 |
| 25 | 80.0 | 65 | 30.8 |
| 26 | 76.9 | 66 | 30.3 |
| 27 | 74.1 | 67 | 29.9 |
| 28 | 71.4 | 68 | 29.4 |
| 29 | 69.0 | 69 | 29.0 |
| 30 | 66.7 | 70 | 28.6 |
| 31 | 64.5 | 71 | 28.2 |
| 32 | 62.5 | 72 | 27.8 |
| 33 | 60.6 | 73 | 27.4 |
| 34 | 58.8 | 74 | 27.0 |
| 35 | 57.1 | 75 | 26.7 |
| 36 | 55.6 | 76 | 26.3 |
| 37 | 54.1 | 77 | 26.0 |
| 38 | 52.6 | 78 | 25.6 |
| 39 | 51.3 | 79 | 25.3 |
| 40 | 50.0 | 80 | 25.0 |

It is an elementary principle of optics that a ray falling on a lens at a point other than its optical center is deviated through an angle whose cotangent is equal to the focal length of the lens divided by the distance between the point of incidence and the optical center. It follows that, in the instrument in question, the rays are first deviated in one direction by the concave lens, and then bent back in the opposite direction by the convex lens, the cotangent of the resultant angle of deviation being the focal length of the lens divided by the distance between the optical centers of the two lenses, which is equal to the amount by which the slide is drawn out. The above table is therefore computed by dividing the length of the space occupied by a given number of divisions on the slide into the focal length of the lens. For example, in the range-finder as at present manufactured the lenses are 0.75 diopter, corresponding to a focal length of 1333 millimeters. The divisions on the slide are each 2/3rds of a millimeter or 1/2000th of the focal length, so that the cotangent value corresponding to one division is 2000/1, to two divisions 2000/2, and so on. This particular focal length and size of divisions have been chosen arbitrarily as being the most convenient, having regard to the size of the instrument and limits of perception with the naked eye.

This table may be divided into two parts, one secured to the upper wall of the case 1 and the other to the lower wall of the case 1. The two parts of the table may be engraved on said walls, but are preferably printed on paper strips which are attached to the upper and lower walls of the case and are protected against wear by sheets of celluloid 11 screwed to said walls.

The instrument when constructed as above described is provided with a handle by which it may be held in position. This handle preferably consists of a strap 12 pivotally connected to the center of the case 1 and adapted when the instrument is not in use to fit snugly against the rear halves of the side walls of the case and serve as a means for retaining the prism within the case.

The above described range finder or telemeter is used in the following manner:—

The handle 12 is turned from its normal position, that indicated in Fig. 1, to a position at right angles to the case of the instrument, as shown in Figs. 2 and 3. The slide 5 is then in its innermost position, and the optical centers of the convex and concave lenses, 4 and 6, are co-incident, in other words the two lenses act as a plane plate. The instrument is held in position with the object, the range or distance of which is to be obtained, hereinafter referred to as the range-object, on the right or left hand side of the user, and the prism 2 is caused to project through the opening 1' in the case 1 of the instrument. An image of said range-object will then appear in the projecting part of the prism 2, by double reflection within the prism, which therefore reflects a constant angle equal to the apical angle of the prism.

This double reflection is shown by Fig. 6, in which the range-object is indicated by R. O. The observer then notes in the line of sight an object, which viewed over the upper edge or under the lower edge of the instrument appears immediately above or below the reflected image of the range-object. This second object, hereinafter referred to as the direction-point, which should be as far away as possible, is kept steadily in view, and a certain distance, say 10 yards, is paced by the observer in the direction of said direction-point. The reflected image of the range-object will now be displaced to the left or right of the direction-point according as the range-object is to the left or right of the user. The position of the slide 5 carrying the convex lens 6 is slowly adjusted until such time as the image of the range-object again appears imediately below or above the direction-point. The division on the slide 5 appearing at the gate 7 is noted. The range or distance is then found by taking the cotangent value appearing by the side of said division in the table of divisions and cotangent values and multiplying said value by 10 yards or other length of the distance paced by the observer.

This co-tangent value is that of the angle hereinbefore referred to as the angle of deviation, which in the form of instrument now being described is determined by a line passing through the axes of the convex and concave lenses when the convex lens is in its innermost position, i. e., when said axes are coincident, and a line passing through the point on the convex lens immediately opposite the optical center of the concave lens and the focal point on the axis of the convex lens when the position of the latter has been adjusted.

As an example of the use of the instrument it may be assumed that the observer has paced 10 yards and that in order to bring the range-object immediately above or below the direction-point the slide 5 has been drawn out until the division 50 appears at the gate 7, Fig. 3. The co-tangent value appearing in the table of divisions and cotangent values, hereinbefore given, is 40. Consequently in this particular instance the range or distance of the object is 40×10 or 400 yards. Similarly in other cases the range or distance of any object may be found by multiplying the distance paced by the observer by the co-tangent value corresponding to the division on the slide 5 which appears at the gate 7 when the slide has been moved out to bring the image of the range-object immediately above or below the direction-point.

The modified construction of instrument illustrated by Figs. 7 to 12 does not differ materially from the instrument illustrated by Figs. 1 to 6.

In the case of the modified construction of instrument the prism 2 is made of a depth equal to about half the depth of the interior of the case 1 and is fixed in position therein by means of a strap 13. The convex lens 6 used in this case consists of a strip which is formed by cutting away the side parts of a lens of the same diameter as the length of the strip, and, as in the case of the first form of instrument, the slide 5 carrying said lens is mounted within the case 1 behind the concave lens 4. The concave lens is preferably decentered that is to say is cut out of the margin of a larger concave lens of the same diameter as the convex lens. As in the case of the first described form of instrument the optical centers of the two lenses coincide when the slide carrying the convex lens is in its innermost position. The end wall of the case 1 is formed with an opening 14 so that the image of the range-object may fall on the prism 2 when the case is held with said opening directed toward the range-object. The side wall of the case opposite to that to which is fixed the concave lens 4 is provided with a window 15 through which the concave and convex lenses and prism are viewed.

This modified construction of instrument is used as follows:—

The user stands in a position with the range-object on his left and holds the instrument between this thumb and forefinger with the opening 14 directed toward the range-object and with the window 15 facing him. An image of the range-object will be seen in the prism 2 when the eye is brought close to the window 15. In this instance the user observes through the lenses an object, the direction-point, immediately above the image of the range-object, and makes a definite number of paces, say 10 paces, toward said direction-point. The image of the range-object will now be displaced toward the left. The slide 5 is slowly moved out until the direction-point is again immediately over the range-object. The division appearing at the gate 7 is noted, and the distance of the range-object is found, as in the case of the first described form of instrument, by multiplying the co-tangent value appearing by the side of said division, in the table of divisions and co-tangent values, by the number of paces.

When the object, the range or distance of which is to be found, is on the right of the user of the instrument the latter is inverted, the lenses being then below the prism. In this case however, the image of the range-object will be displaced to the right of the direction-point as the user paces toward the direction-point. The range or distance of the object is ascertained in the same way as in the first described form of instrument.

In Figs. 2 and 8 are illustrated diagrammatically the rays from the range object, designated by R, and the direction-point, designated by D, the position of the observer being designated by O, while in Fig. 14 the second position of the observer is designated by O'.

The last described form of instrument, which is the preferred embodiment of the invention, though primarily intended to be used in the above described manner, may be used in other ways.

For instance it may be used for ascertaining the range of a distant object of known length or height. In both of these cases the prism is not used.

If the length of said object is known then the user holds the instrument in a horizontal position with the window 15 a few inches in front of his eye. The object is sighted through the lenses and also over the top of the instrument. The different parts of the object appear unbroken and continuous, owing to the concave lens being decentered, so that its optical center is coincident with that of the convex lens. The slide is slowly pulled out until the right-hand side of the object as seen through the lenses is apparently in line with the left-hand side of the object viewed over the top of the instrument. The division on the slide 5 appearing at the gate 7 is noted, and the range or distance of the object found by multiplying the co-tangent value appearing in the table of divisions and co-tangent values at the side of said division by the length of the object.

If the height of the object is known then the instrument is held in a vertical position with the knob of the slide 5 directed toward the ground and with the window 15 a few inches in front of the eye. The object is sighted through the lenses and along the side of the instrument adjacent to said lenses. The slide is pulled out until the bottom of the object as seen through the lenses appears to be on a level with the top of the object as viewed along the side of the instrument. The division on the slide 5 appearing at the gate is noted and the range or distance of the object found by multiplying the co-tangent value appearing in the table of divisions and co-tangent values at the side of said division by the height of the object.

The same form of instrument may also be used for ascertaining the distance between two inaccessible objects.

The instrument is then used in the following manner. Let A and B, Fig. 13, be the two inaccessible objects. The instrument is held with the opening 14 directed toward the object A so that an image of said object appears in the prism 2. The position of the observer is marked by a peg, and a direction-point D' in line with the image of the object A is observed. The slide 5 is pulled out until a certain division thereof, say the division 40, appears at the gate 7. The observer then walks along the direction line PD' until the image of the object A is once more in line with the direction-point D'. The position X which the observer has then reached is marked by a peg. The user of the instrument then returns to the position P, pushes in the slide 5 to its normal position, and holds the instrument so that an image of the second object B appears in the prism 2. He then observes a direction-point $D^2$ in line with the image of the object B. He again pulls out the slide 5 until the division previously used, the division 40, appears at the gate 7, and marches along the new direction-line $PD^2$ until the image B is again in line with the direction point $D^2$. The observer is then in a position Y. This position is marked by a peg. The distance between X and Y is then paced. This distance multiplied by 50, the co-tangent value appearing in the table of divisions and co-tangent values by the side of the division 40, gives the distance between the two objects A and B.

Having now described my invention what I have invented and desire to secure by Letters Patent in the United States is as follows:—

1. A range finder or telemeter comprising a case, a variable prism within said case, consisting of concave and convex lenses of equal but opposite power, a slide carrying one of said lenses mounted in said case and provided on its upper side with equally spaced divisions, and a right-angled isosceles prism silvered on its hypotenuse and so mounted in the case with respect to the walls of the latter that the image of the range-object seen by the user of the instrument is that obtained by double reflection within the prism, all reflections resulting from the direct reflection off the hypotenuse being cut off by the walls of the case, substantially as described.

2. A range-finder or telemeter comprising a box-shaped case formed with openings in its side walls and with a gate in one of its walls, a variable prism within said casing consisting of concave and convex lenses, a slide carrying one of said lenses mounted in said case and provided on one side thereof with equally spaced divisions, and a right-angled isosceles prism, silvered on its hypotenuse, so mounted in the case that an image of a range object seen by the user of the instrument is that obtained by double reflection within the prism.

3. A range finder or telemeter consisting of a box-shaped case formed with an opening in its front wall, with oppositely disposed windows near the ends of its side walls and with a gate in the upper half of its rear wall, a concave lens of weak power fixed in rear of one of said windows, a slide, fitting said gate, mounted in said case in rear of said concave lens and provided on its upper side with equally spaced divisions and at its rear with a knob, a convex lens of a power equal to that of said concave lens mounted in said slide, and a right-angled prism silvered on its hypotenuse and fixed in said case with its hypotenuse below said slide, substantially as described.

In testimony whereof I have signed my name to this specification in the presence of two subscribing witnesses.

CHARLES HYMANS.

Witnesses:
CHARLES FLETCHER ENNIS,
ARTHUR F. ENNIS.